United States Patent [19]

Sahay

[11] 4,278,344

[45] Jul. 14, 1981

[54] RECIRCULATING DUPLEX DOCUMENTS COPIER

[75] Inventor: Ravi B. Sahay, Penfield, N.Y.

[73] Assignee: Xerox Corporation, Stamford, Conn.

[21] Appl. No.: 71,613

[22] Filed: Aug. 31, 1979

[51] Int. Cl.³ ........................ G03B 15/00; G03B 27/32

[52] U.S. Cl. .................................. 355/14 SH; 355/23

[58] Field of Search .............. 355/3 SH, 23, 24, 14 R, 355/14 C, 14 CU, 14 SH, 77

[56] References Cited

U.S. PATENT DOCUMENTS

| | | | |
|---|---|---|---|
| 4,050,805 | 9/1977 | Hage | 355/14 SH |
| 4,067,649 | 1/1978 | Hubbard et al. | 355/3 SH X |
| 4,080,060 | 3/1978 | Nothmann | 355/23 |
| 4,099,150 | 7/1978 | Lyman | 355/23 X |
| 4,140,387 | 2/1979 | Gustafson | 355/23 X |
| 4,158,500 | 6/1979 | DiFrancesco et al. | 355/23 X |
| 4,166,614 | 9/1979 | Hamlin et al. | 271/3.1 |

*Primary Examiner*—Donald A. Griffin

[57] ABSTRACT

A system of pre-collation copying a set of duplex document sheets by inhibiting the operation of a document inverting path during successions of contiguous plural document copying circulations to copy only one side of the documents during each succession, and actuating the document inverter path only during single document circulations at the end of a succession, after the document set has been circulated a number of times in that succession equal to the quotient of a constant number divided by the number of document sheets in the document set. Opposite sides of the documents are copied in alternate successions, and all the copies made during every other succession of plural recirculations are temporarily stored in a buffer set of a pre-determined maximum desired copy sheet capacity. The constant number corresponds to this copy sheet capacity.

12 Claims, 1 Drawing Figure

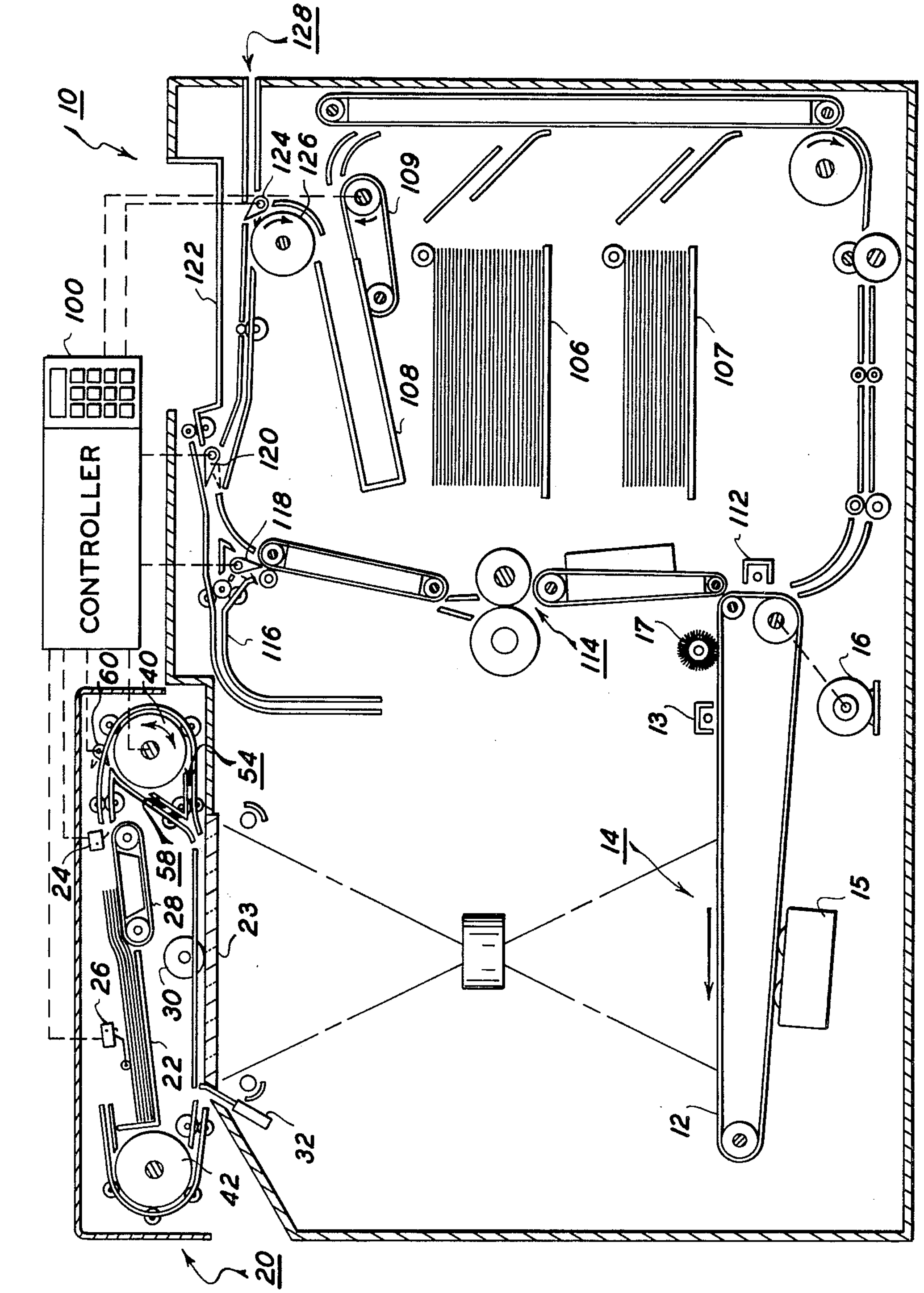
10
128
124
126
109
122
100
CONTROLLER
120
118
116
108
106
107
112
114
17
16
13
60
40
54
58
24
28
23
26
30
22
14
15
12
32
42
20

RECIRCULATING DUPLEX DOCUMENTS COPIER

The present invention relates to an improved automatic duplex document handling system for providing pre-collation copying.

As xerographic and other copiers increase in speed, and become more automatic, it is increasingly important to provide higher speed yet more reliable and more automatic handling of both the copy sheets and the original documents being copied, i.e., both the output and input of the copier. The providing of duplex document sheet copying greatly complicates and increases the document and copy sheet handling complexities.

As used herein, the term "sheet" refers to a piece of paper or other conventional individual substrate. The term "page" refers to an image on one side of a sheet.

The term "duplex copying" may be more specifically defined into several different, known copying modes. In duplex/duplex copying, both sides (both pages) of a duplex document sheet (which has images on both sides) are copied onto both sides of a single copy sheet. In duplex/simplex copying, both sides of a duplex document are copied onto only one side of two successive copy sheets. In simplex/duplex copying, the images of two successive simplex document sheets, which have images on only one side, are copied onto opposite sides of a single copy sheet. In the printing industry, as opposed to the copier industry, two-sided copying may be referred to as "backing-up" rather than duplex copying. The present invention particularly relates to duplex/duplex copying.

In a collated set of duplex document or duplex copy sheets, the odd pages 1, 3, 5, etc., will normally appear on the first or front sides, and the next higher even pages 2, 4, 6, etc., will normally be on the respective second or back sides. Also, the number of duplex sheets will always be less than the number of pages on those sheets. In contrast, in a set of simplex document or copy sheets, the number of the sheet will typically also correspond to the page number. Thus, an odd number of simplex sheets will normally have an odd number of page images, but a set of duplex sheets may have an odd or even number of pages. If there are an odd number of pages in the set of duplex sheets the backside of the last sheet will normally be blank (empty).

Non-pre-collation duplex copying (for either duplex/duplex or simplex/duplex copying) may be done by first making in the copier processor a "buffer set" comprising a plurality of simplexed copy sheets (printed only on their first sides). The buffer set sheets are temporarily stored preferably in a duplex buffer tray, and then fed back through the same copying processor for a second pass printing of the proper opposite page on their opposite sides. Such systems may be referred to as sequential or dual pass duplexing systems, and are used, for example, in the "Xerox" "4000" and "9400" Xerox Corporation copiers. Examples of such systems for handling the copy sheets being duplexed are shown in U.S. Pat. Nos. 3,615,129, issued Oct. 26, 1971 to W. A. Drawe, et al.; 3,645,615, issued Feb. 29, 1972, to M. R. Spear, Jr. Especially noted are 3,035,073, issued July 12, 1977 to G. DelVecchio and 3,851,754, issued Oct. 15, 1974, to E. E. Drexler et al. on duplex/duplex.

Of interest as disclosing a duplex copy system which is also a pre-collation copying system are U.S. Pat. Nos. 3,630,607, issued Dec. 28, 1971, to H. Korn and 4,116,558, issued Sept. 26, 1978, to J. A. Adamek et al. For pre-collation duplex copying the buffer set copies are not identical. They are each copies of a different document page, and thus their order and orientation must be maintained and coordinated with the document pages to be printed on their opposite sides. This Adamek et al. patent, and allowed U.S. applications Ser. Nos. 919,892, filed June 28, 1978, by F. R. Hynes, and 919,199, filed June 26, 1978, by L. M. Wood now U.S. Pat. No. 4,172,655, all with the same assignee as this case, are of particular interest as disclosing two separated buffer sets of copy sheets in a duplex buffer for bi-directional simplex/duplex pre-collation copying. The latter U.S. Pat. No. 4,172,655 notes Col. 4, lines 37–39 that more than one set of one-sided copies could be placed on transport means 64 at the same time.

Pre-collation copying is a desirable feature for a copier. As discussed, for example, in detail in U.S. Pat. No. 3,963,345, issued June 15, 1976, to D. J. Stemmle, et al., at Columns 1–4, and the above-cited Adamek patent, pre-collation copying provides a number of important advantages. The copies exit the copier in pre-collated sets, and do not require subsequent sorting in a sorter or collator. Any desired number of such copy sets may be made by making a corresponding number of recirculations of the document set in collated order past a copying station and copying each document once each time it recirculates. On-line finishing and/or removal of the completed copy sets may be provided while additional copy sets are being made from the same document set.

However, a disadvantage of pre-collation copying systems is that the documents must all be repeatedly circulated, and copied in a pre-determined order only once in each circulation, by a number of circulations equivalent to the desired number of copy sets. Thus, it may be seen that increased document handling is necessitated for a pre-collation copying system, as compared to a conventional post-collation copying system. Maximizing document handling automation and copying cycle efficiency is particularly important in pre-collation copying. If the document handler cannot circulate and copy documents in coordination with the copy sheets in the correct order, or must skip documents or copying cycles, the total copying time for each copy set will be increased.

In a post-collation copying system, all the desired copies are made at one time for each document page and collated by being placed in separate sorter bins. The document set need only be circulated once and multiply copied to fill bins of the copy sheet sorter or collator with the corresponding number of copy sets desired. However, the number of copy sets which can be made in one circulation is limited by the number of available bins, and a sorter adds space and complexity and is not well suited for on-line finishing.

Some examples of art relating to simplex document pre-collation document handling systems in which each document sheet is withdrawn from the bottom of a document set stack for copying once in each circulation and then returned to the top of the document stack for repeated copying circulations include: German Patentschrift No. 1,128,295, Oct. 25, 1962 to H. Rankers; and U.S. Pat. No. Re. 27,976, (originally U.S. Pat. No. 3,499,710, issued Mar. 10, 1970) to L. W. Sahley; U.S. Pat. No. 3,536,320, issued Oct. 27, 1970, to D. R. Derby; U.S. Pat. No. 3,552,739, issued Jan. 5, 1971, to R. R. Roberts, et al.; U.S. Pat. No. 3,556,511, issued Jan. 19, 1971, to A. Howard, et al.; U.S. Pat. No. 3,888,579, issued June 10, 1975, to V. Rodek et al.; and U.S. Pat. No. 3,937,454, issued Feb. 10, 1976, to R. H. Colwill. A recent example of a pre-collation copying system of this type, with circuitry and switches for counting the number of documents recirculated and for counting the completion of each set circulation, and face-up loading of the document stack, is shown in U.S. Pat. No. 4,076,408, issued Feb. 28, 1978, to M. G. Reid et al., and in the U.S. Patent Office Defensive Publication T957,006 of Apr. 5, 1977, based on application Ser. No. 671,865, also filed Mar. 30, 1976, by M. G. Reid et al. Other examples of document sheet sensors are disclosed in U.S. Pat. No. 3,790,158, issued Feb. 5, 1974, to J. E. Summers et al.

Further examples of copier systems with particular reference to control systems for document and sheet handling are described in U.S. Pat. Nos. 4,062,061, issued Dec. 6, 1977, to P. J. Batchelor et al.; 4,078,787, issued Mar. 14, 1978, to L. E. Burlew et al.; 4,123,155, issued Oct. 31, 1978, to W. L. Hubert; 4,125,325, issued Nov. 14, 1978, to P. J. Batchelor et al.; and 4,144,550, issued Mar. 13, 1979, to J. M. Donohue et al. While conventional integral software incorporation into the copier's general microprocessor logic circuitry and software of the functions and logic defined herein as taught by the above and other patents and copiers is preferred, it will be appreciated that the functions and systems disclosed herein may be alternatively conventionally incorporated into a copier utilizing any other suitable or known copier software or hard wired logic systems, cam-bank switch controllers, etc. The output control of the exemplary sheet handling systems disclosed herein may be accomplished by activating known electrical solenoid controlled sheet deflector fingers and drive motors or their clutches in the indicated sequences, and conventional sheet path sensors or switches may be utilized for counting and keeping track of the positions of documents and copy sheets.

The following U.S. Pat. Nos. are noted as specifically relating to duplex document pre-collation copying: 4,078,786, to K. K. Stange, and 4,109,903 to Stange et al.; 4,099,150 to J. L. Conin; 4,111,547 to D. J. Stemmle; 4,140,387 to G. B. Gustafson and 4,158,500 to A. B. DiFrancesco. Of particular interest to the duplex document pre-collation copying system herein are allowed U.S. applications Ser. No. 825,743, filed Aug. 18, 1977 and published Mar. 1, 1979 as German OLS No. 2,828,699, and Ser. No. 825,571 now U.S. Pat. No. 4,166,614 issued Sept. 4, 1979 filed on the same date by the same assignee, now U.S. Pat. No. 4,166,614 issued Sept. 4, 1979. These applications teach inverting the set of duplex documents each time they are circulated for copying to produce one buffer set in the duplex tray on alternate circulations. Another recent example of a duplex or simplex document recirculation pre-collation copying system is disclosed in article No. 16332, pp. 49–52, of the November 1977 issue of "Research Disclosure", published by Industrial Opportunities, Ltd., Homewell, Havant, Hampshire, U.K. A corresponding U.S. application Ser. No. 813,041, was filed July 5, 1977, and its equivalent U.K. application No. 2,000,749A was published Jan. 17, 1979.

It is known to invert, or not invert, (by reversing a feed roller), a duplex document fed from a document tray to a copier platen, as disclosed in IBM Technical Disclosure Bulletin Vol. 14, No. 5, P. 1547, published October 1971. Also noted thereon is the above-cited U.S. Pat. No. 4,158,500 issued June 19, 1979 to A. B. DiFrancesco et al. However, many sheet inverter systems have reliability, e.g., sheet jam or misfeed problems, and the present invention greatly reduces those document feeding problems by greatly reducing the number of inverter system operations for duplex document pre-collation copying.

The duplex/duplex pre-collation copying system herein is, importantly, fully compatible with the simplex/duplex pre-collation copying systems of the above-cited Adamek patent or U.S. application Ser. No. 57,855, filed July 16, 1979, by R. E. Smith and J. R. Yonovich for the same assignee.

All of the patents and applications cited herein for background or art purposes are also incorporated by reference herein to the extent they provide teachings of usable or alternative systems or hardware for the disclosed embodiments herein.

A preferred feature of the invention is to provide; in a method of pre-collation copying of both sides of a set of duplex document sheets by plurally recirculating and inverting said documents and serially copying said documents during said plural circulations, wherein the number of said plural circulations is determined by the number of pre-collated copy sets being made from said document set; the improvement comprising copying only one side of said duplex documents in a first succession of contiguous plural document circulations, and then copying only the other side of said duplex documents in a second succession of contiguous plural document circulations, and alternating repeating said first and second successions of document circulations, wherein the number of said document set circulations in said first and second successions of document circulations are substantially equal to one another but vary in number depending upon the number of documents in said document set.

A preferred embodiment herein discloses, in a method of pre-collation copying a set of duplex document sheets, wherein the documents can be inverted an odd total number of times during a circulation utilizing inverter means, for copying the opposite sides of the documents in a subsequent circulation, controlled by a control means; the improvement comprising; actuating said inverter means with said control means to invert the document set during the first document set copying circulation, inhibiting the operation of said inverter means with said control means during successions of subsequent contiguous plural document copying circulations to copy only one side of said documents, actuating said inverter means again during a single document circulations at the end of each of said successions, which occurs each time after the document set has been circulated a number of times in succession equal to the quotient of a constant number divided by the number of document sheets in said document set, to copy opposite sides of said documents in alternate said successions of equal numbers of plural document set circulations; said inverter means being so operated by a number of times determined by said control means from the total number of copies to be made; and wherein the copies made in alternate said successions of document circulations are temporarily stored in a buffer set of a pre-determined maximum copy sheet capacity, and wherein said constant number corresponds to said copy sheet capacity.

Further features and advantages of the invention will be better understood by reference to the following description, and to the drawing forming a part thereof, wherein:

The FIGURE is a schematic side view of an exemplary copier and an exemplary document feeder therefor incorporating the present invention.

Referring to the exemplary xerographic copier 10 shown in the FIGURE, and its exemplary automatic document feeding unit 20, it will be appreciated that various other recirculating document feeding units and copiers may be utilized with the present invention, including various ones disclosed in the above-cited references.

In the recirculating document handler (RDH) 20 disclosed here, individual original documents are sequentially fed from the bottom of a stack of documents placed by the operator face-up in normal collated order in the document storage area or stacking tray 22. They are fed to the imaging station 23, which is the conventional platen of the copier 10, to be conventionally imaged onto a photoreceptor 12 for the production of copies in a generally conventional xerographic manner. The document handler 20 has conventional switches or other sensors such as 24 for sensing and counting the individual documents fed from the tray 22, i.e., counting the number of document sheets circulated. A conventional resettable bail drops to indicate through its associated switch or sensor 26 the completion of each circulation of the complete document set, by sensing that all the documents have been fed out from under it, and then is automatically reset on the top of the stack before the next circulation. The document feeder 20 is selected or adapted to serially sequentially feed the documents, which may be various conventional sizes and weights of sheets of paper or plastic containing information indicia to be copied, on one or both sides, e.g., printed or typed letters, drawings, prints, photographs, etc. A bottom feeder 28 feeds the bottom-most document sheet, on demand, through one of two feed paths, to a platen drive 30 which moves the document into a registration gate 32 over the copier platen 23.

In this document feeder 20 each document is selectably inverted or not inverted as it is fed from the tray 22 to the imaging station 23. This is accomplished before the document has been copied, by a selectably reversable sheet drive roller 40 and a gate 60, in these paths. Each document sheet is fed initially from tray 22 around the outside of the roller 40. If it continues around roller 40 it is fed invertedly through path 54 onto the platen 23. However, there is a decision gate 60 in the document path adjacent the entrance to roller 40, comprising pivotable deflector fingers, operable after the trail edge of the document has passed this gate. Actuation of the gate 60, together with reversal of the roller 40, causes the further recirculatory movement of the documents through a different transport path 58 to the platen for copying. Thus, these two different paths are the first (simplex) transport path 54 and the second (duplex) transport path 58. The second or duplex transport path 58 effectively has no sheet inversion. This is accomplished here through the reversal of the roller 40, so that the documents only go partially around the roller 40 and then are reversed in direction and fed directly back through the now deflected gate 60 into the duplex path 58 which feeds directly onto the platen 23. Thus, in this duplex path 58, the documents arrive at the platen without being inverted from their original orientation in tray 22. For example, if the even sides of the duplex documents are face-down in the tray 22, they will still be face-down when they reach the platen 23 for copying, providing the duplex path 58 is utilized.

In contrast, the first or simplex transport path 54 transports the documents unidirectionally fully around the roller 40 onto the platen 26. Thus, the orientation on the copying platen of the documents fed through the simplex path 54 is inverted from their previous orientation in the tray 22.

It may be seen that the return path of the documents to the tray 22 from the platen after they are copied is always the same, and contains one sheet inversion. In either the simplex or duplex path cases, the documents are fed back around a second, but non-reversing, inverting roller document feeding system 42 which returns them to the top of the restacking tray 22. Thus, with the selection of the simplex transport path 54 the documents are inverted twice around both rollers 40 and 42, and with the selection of the duplex transport path 58 the documents are inverted once, referring to the total circulation path from the bottom of the tray 22 back to the top thereof. Therefore, bottom of the tray 22 back to the top thereof. There it may be seen that the reversal or non-reversal of the roller 40 and the coordinate actuation or non-actuation of the selector gate 60 therewith during a document set circulation determines whether that set of documents will be recirculated with a total of one or two inversions in that circulation.

In either case, since the documents can be continuously restacked simultaneously with continuous feeding by the feeder 28, continuous multiple recirculations can be provided for pre-collation copying. However, with two total path inversions (i.e. utilizing the simplex path 54), the same sides of the documents will be exposed in the next and each following circulation, and the documents will always be restacked in the tray 22 in their same original orientation. In contrast, with only one total path inversion (using the duplex path 58) the documents will be restacked in the tray 22 inverted from their previous orientation. Thus, the apparatus of path 58 is referred to as the inverter because its total circulation path effect is inversion, even though its local effect is actually non-inversion, as described above. Thus the opposite sides or faces of the documents may all be copied in the subsequent circulation. This is desirable for copying duplex documents.

However, as previously described, the operation of the inverter mechanisms involved in this duplex document inversion, utilizing the duplex sheet reversal path 58, inherently increases reliability problems if it must be frequently used for multiple recirculations of a duplex document set. As will be described herein, the present invention provides a copying system which minimizes the use of this duplex transport path 58, i.e., minimizes the reversal of the roller 40 and the operation of the gate 60 (or any other sheet inverting mechanism which might be used instead). With the system disclosed herein, most of the document set recirculations may be done in a simple non-inverting, non-reversing, continuous loop path provided through the simplex path 54. That is, the number of circulations through the duplex path 58 is much less than the number of copy sets made with this system.

The exemplary copier 10 processor and its controller 100 will now be described in further detail. The copier 10 conventionally includes a xerographic photoreceptor belt 12 and the xerographic stations acting thereon for respectively charging 13, exposing 14, developing 15, driving 16 and cleaning 17. The copier 10 is adapted to provide duplex or simplex pre-collated copy sets from either duplex or simplex original documents copied from the same RDH 20. Two separate copy sheet trays 106 and 107 are provided to feed clean copy sheets from either one. The control of the sheet feeding is, conventionally, by the machine controller 100. The controller 100 is preferably a known programmable microprocessor exemplified by the patents cited in the introduction, which conventionally also controls all of the other machine functions described herein including the operation of the document feeder, the document and copy sheet gates, the feeder drives, etc. As further disclosed in those references, it also conventionally provides for storage and comparison of the counts of the copy sheets, the number of documents recirculated in a document set, the number of copy sets selected by the operator through the switches thereon, etc.

The copy sheets are fed from a selected one of the trays 106 or 107 to the xerographic transfer station 112 for the transfer of the xerographic image of a document page to one side thereof. The copy sheets here are then fed through vacuum transports vertically up through a conventional roll fuser 114 for the fusing of the toner image thereon. From the fuser, the copy sheets are fed to a gate 118 which functions as an inverter selector finger. Depending on the position of the gate 118 the copy sheets will either be deflected into a sheet inverter 116 or bypass the inverter and be fed directly onto a second decision gate 120. Those copy sheets which bypass the inverter 116 (the normal path here) have a 90° path deflection before reaching the gate 120 which inverts the copy sheets into a face-up orientation, i.e. the image side which has just been transferred and fused is face-up at this point. The second decision gate 120 then either deflects the sheets without inversion directly into an output tray 122 or deflects the sheets into a transport path which carries them on without inversion to a third decision gate 124. This third gate 124 either passes the sheets directly on without inversion into the output path 128 of the copier, or deflects the sheets into a duplex inverting roller transport 126. The inverting transport 126 feeds the copy sheets into a duplex tray 108. The duplex tray 108 provides intermediate or buffer storage for those copy sheets which have been printed on one side and on which it is desired to subsequently print an image on the opposite side thereof, i.e. the sheets being duplexed. Due to the sheet inverting by the roller 126, these buffer set copy sheets are stacked into the duplex tray face-down. They are stacked in the duplex tray 108 on top of one another in the order in which they were copied.

For the completion of duplex copying, the previously simplexed copy sheets in the tray 108 are fed seriatim by the bottom feeder 109 for the duplex tray back to the transfer station for the imaging of their second or opposite side page image. This duplex copy sheet path is basically the same copy sheet path provided for the clean sheets from the trays 106 or 107, illustrated at the right hand and bottom of the FIGURE. It may be seen that this sheet feed path between the duplex feeder 109 and the transfer station 112 inverts the copy sheets once. However, due to the inverting roller 126 having previously stacked these sheets face-down in the tray 108, they are presented to the transfer station 112 in the proper orientation, i.e., with their blank or opposite sides facing the photoreceptor 12 to receive the second side image. The now duplexed copy sheets are then fed out through the same output path through the fuser 114 past the inverter 116 (bypassing the inverter 116) to be stacked with the second printed side face-up. These completed duplex copy sheets may then be stacked in the output tray 122 or fed out past the gate 124 into the output path 128.

The output path 128 transports the finished copy sheets (simplex or duplex) either to another output tray, or, preferably, to a finishing station where the completed pre-collated copy sets may be separated and finished by on-line stapling, stitching, glueing, binding, and/or off-set stacking.

It is desirable with the present system to minimize the operation of the copy sheet output inverter 116, in order to simplify and shorten the paper path and increase its reliability. The exemplary inverter 116 here operates by the gate 118 deflecting a copy sheet face-down into the first or lower nip of the illustrated three roll inverter. The copy sheet's movement is then reversed within the curved inverter chute by known or suitable sheet reversing means, e.g., further rollers, or resilient rebound members, and the copy sheet is driven out of the inverter 116 through the second or upper nip of the same three roll inverter directly toward the gate 120. The convex shape of the inverter chute acting on the beam strength of the sheet causes the sheet trail edge to flip up toward this second nip. The net result is that the copy sheet output from the inverter 116 to the gate 120 here is face-down rather than face-up. Note that the inverter 116 here is positioned at a corner of an otherwise inherent 90° paper path inversion as described above. However, any other suitable sheet inverter may be utilized, and may be provided at different positions in the copy sheet output path. Examples of similar or substitutable sheet inverters are disclosed in U.S. Pat. Nos. 2,901,246; 3,337,213; 3,416,791; 3,523,687; 3,856,295; and 4,044,285.

By way of further background, as to the difficulties in copy sheet output orientation and order for pre-collation, for which the inverter 116 may be utilized, there are several known problems in maintaining the proper collation of the copy sheets in the output tray or finisher, particularly with reproducing machines which must do both simplexing and duplexing. For example, if simplex copy sheets are generated in reverse serial (N to 1) page order, the copy sheets will be properly collated if they are output stacked seriatim on top of the prior sheet in that same order, and are face-up. If this is done, as here, then when the operator picks up an individual completed stack or set of copy sheets, it will be in the proper forward page order (1 to N) from the top of the stack to the bottom thereof.

The same is true for duplex, but with the additional output collation requirement that a lower, and odd, document page number be on the top of a copy sheet and the next higher, and even, document page number be on the bottom of that copy sheet, so that the completed outputted duplex copy set is in the page order $\frac{1}{2}$; $\frac{3}{4}$; 5/6; etc. This is made more difficult by the fact that the total overall copy sheet path for the copies being duplexed is typically different, i.e., contains more inversions, than the overall copy path for copy sheets which are only being simplexed, since it is necessary to turn the duplex copy sheet over to present its opposite side for the second copying pass. Yet it is desired to have commonality, i.e., to utilize the same sheet feeding path to the maximum extent possible for both duplex and simplex copies, and to avoid using an output inverter for either.

For the duplex/duplex copying system described herein, the output inverter 116 is not required, since the above-described collation criteria are all met by the paper paths and duplex document copying sequences provided here. In the N to 1 duplex copying sequence here the next lower, and odd, page number is automatically placed in the second side of a duplex copy sheet in its second pass through the transfer station 112, as will be apparent from the further description herein, and this lower page number side is exited face-up. In the duplex sheet path herein, each sheet to be duplexed is inverted once at the duplex tray input 126, a second time in the return path to the transfer station 112, and a third time in the path from the transfer station 112 to the output 128, to exist last printed face up.

It will be appreciated that if it is desired to pivot away the RDH 20 from the platen 23 to provide alternative manual document copying in the normal 1 to N page order, or to provide a semi-automatic document feeder which is stream fed by the operator in 1 to N order, that the output inverter 116 could be utilized to provide face-down output to maintain collation.

Simplex/duplex pre-collation copying can be provided using the same disclosed apparatus. Since an inverter 116 is available, the buffer set can be copies of either the odd or even pages.

Simplex/duplex pre-collation copying can also be compatibly accomplished here without requiring an inverter 116 or other source of a variable number of output path inversions, if desired. This can be done on the same RDH with the same paper path by adapting the system described in the above-cited co-pending U.S. application by Smith and Yonovich, to always place only even side copies in the buffer set. Another way is to always feed the Nth duplex copy sheet to the transfer station 112 twice, even if one side is to be blank. To put it another way, if there is no even page document image available to be copied onto the backside of the Nth duplex copy sheet, one may be artifically generated or simulated in order to maintain proper output collation. Alternatively, the inverter 116 can be used for inverting this Nth duplex copy sheet to avoid this re-processing or printing of a blank side.

By way of background on the latter, there is an additional output collation problem in the situation where there is an odd rather than even number of simplex document pages to be copied onto a duplex copy set. In this case the Nth or last page of the set of duplex copies is really a simplex copy because the last copy sheet page in each copy set will only have an image on one side thereof. It is known to be undesirable to run this blank last duplex copy sheet page through the transfer station for the pseudo printing of a blank image on the backside thereof simply in order to attain the needed additional inversion of that sheet, since this wastes processing time and also can cause undesirable background contamination of the blank backside of this last page sheet. This can be avoided by directly outputting the copy sheet with the last odd page set rather than returning it to the duplex tray, i.e., this last odd page can be printed on a clean copy sheet fed from a copy sheet tray rather than from the duplex tray. However, this normally results in this last sheet having a different number of inversions and therefore being improperly oriented in the output set unless it is specially inverted. However, in order to treat the last duplex copy page differently in this manner, it is desirable to be able to know whether there is an odd or even number of simplex documents, since this problem only arises in the case of an odd number of simplex document pages. If the documents are being copied in forward serial order, i.e., 1 to N, this is not a problem because any blank copy sheet page will be after the last (nth) document copied, and the document set can be counted as it is copied to determine whether N is an odd number. However, where the documents are being copied in reverse serial order (N to 1), as here, if N is an odd page number, the first (Nth) copy sheet fed will be the one requiring special duplex processing, i.e., having a blank backside. Since this Nth copy sheet is fed before the documents have been counted it is not known whether the page is odd or even.

The above cited co-pending application by Smith and Yonovich teaches that one desirable solution is to count the number of documents in a pre-copying circulation thereof to determine whether there are an odd or even number, and then to correspondingly control the copying thereafter to insure that only the even pages are copied and placed in the duplex tray, and that an Nth odd page is copied on a blank copy sheet fed from a copy sheet tray, and that the other odd pages are copied on the backsides of sheets fed from the duplex tray.

Returning now to the description of the present duplex/duplex copying system, as previously noted, it is a principal feature of this system that the duplex documents are not inverted on every circulation. That is, the opposite sides of the documents are not copied on immediately alternate document set circulations as taught by the above-cited U.S. applications Ser. Nos. 825,751 and 825,743 and foreign equivalents thereof. Therefore, much less document inverting apparatus actuation is required. In the three document sheet example which will be provided hereinbelow it will be seen that only six operations of the inverting mechanism for the documents is required to complete eighty-six copy sets, rather than eighty-six inverter operations. Yet, with the system herein, proper output collation is maintained without any output inverter. That is, the duplex copy sheets are outputted in N to 1 order with the last printed side up, and the last printed side is the odd image page number and is the preceeding lower page number to the first printed side. That is, page 3 will be printed on the backside of the previously printed page 4 and outputted page 3 up, then page 1 will be printed on the backside of previously printed page 2 and exited with page 1 up and on top of the previous page 3.

For copying a set of duplex original documents as duplex pre-collated copy sets in the present system, as previously described the documents are all loaded into the RDH 20 in their proper order and face-up. Thus, initially their odd page sides are face-up, and their even page sides are face-down. Since it is desired to copy the even page sides first, all of the documents are fed through the duplex path 58 on the first circulation. This results in the even page document sides being copied on the first circulation of the document set, since the duplex path 58 here causes the documents to be copied in the same orientation in which they are lying in the tray 22.

Taking, for example, a five page duplex document set of three duplex document sheets to be duplexed copied with the present system, they would be loaded into the tray 22 in their proper top-to-bottom page order: $\frac{1}{2}$; $\frac{3}{4}$; 5/blank. They would then be copied here in their first circulation in the page order: blank, 4, 2., i.e., the even page sides are copied in N to 1 order. Because they are being fed through the duplex document path 58 in this first circulation, they will end up restacked in the tray 22 at the end of the first circulation in the top-to-bottom stack order 2/1; 4/3; blank/5. I.e., the document sheets are inverted from their initial tray 22 orientation before the beginning of the second circulation. The even page copy sheets (blank, 4, 2,) made on this first copying circulation are stored in the duplex tray 108. Also, in this first circulation the number of document sheets will have been counted by the switch 24 in cooperation with the switch 26 and stored in the controller 100. (For a more typical fully duplexed 6 page original example, substitute "6" for "blank" above).

On the second and subsequent document circulations, there is a very significant difference in the duplex document handling system disclosed herein. The documents are treated as if they were simplex documents for several sequential set circulations, rather than treated as if they were duplex documents. That is, the duplex documents are continuously fed for a number of circulations through the simplex document path 54 and not the duplex path 58. This results in the documents being restacked in the tray 22 in the same orientation as they are fed therefrom on the second and a subsequent number of circulations. This also results, as desired here, in the same pages being copied in the same order for the second circulation as for the first circulation. That is, in this example, the same page sides blank, 4 and 2 are copied in the second circulation and for a number of circulations thereafter, and all of the copies made in this second and subsequent circulations are also fed to the duplex tray 108 to add to the buffer set therein. Thus, multiple buffer sets are accumulated in the duplex tray 108 in this system.

With the present system, the above-described second circulation mode is plurally repeated in an immediate and uninterrupted sequence for a total number of subsequent circulations controlled by the number of document sheets and the capacity of the duplex tray 108, as will be further described herein. The number of said circulations, and therefore the number of copy sheets made therefrom and placed as buffer sets in the tray 108, is also automatically limited to avoid exceeding the copy sheet storage capacity of the duplex bin 108.

The determination of said number of simplex path document set circulations in this first sequence or succession beginning with the second document circulation may be accomplished by conventionally dividing in the controller 100 the number of document sheets into a fixed or constant number. The number of document sheets is available from storing the count of the number of document sheets in the document set in the memory of the controller, as counted during the first document set circulation. The constant number into which it is divided is, or corresponds to, the number of copy sheets which may be effectively stored in the duplex tray 108. This tray 108 capacity depends, of course, on the particular construction of this tray in particular copier, and its input and outut feeders. This selected effective "capacity" for buffer sheets may be set to less than the actual physical capacity. For example, it may be set to a maximum number of sheets which it is acceptable to throw away during job recovery if a jam or misfeed occurs as it is being filled.

The result or quotient of this division of the document set size into this constant number corresponding to the buffer set maximum allowed size is the number of times in succession the duplex document set may be circulated for copying in the same mode, i.e., copying the same sides, circulated through the simplex path 54, without using the inverter or duplex path 58, and therefore without reversing the direction of motion of the documents. In other words, during the first circulation the controller 100 actuates the reverse drive of the roller 40 and the gate 60, but these components are not actuated again until after (and each time) a series of document set circulations has occurred, (counted by switch 26) which is equal to the number of documents divided into a constant buffer set capacity number. To express it another way, this control quotient is the number of successive document circulations between which the document inverter 40, 60 is inhibited by the controller 100.

It may be seen that this quotient is a variable number which will increase as the size of the document set decreases. Taking for example the merely three sheet duplex document set here, and assuming an exemplary 100 sheet capacity duplex tray 108, the quotient of 100 divided by 3 would be 33. (Only the nearest lower integer is utilized since the document set circulations must be integral members). Thus, for this example, after the first document set circulation there would be 32 more document circulations in the simplex path mode for a total of 33 document set circulations copying only the even page sides. The duplex path 58 would be utilized during the first and 34th circulations but not during the intervening 32 circulations. The copy sheets made from these even page sides (blank (or 6), 4, 2), would be accumulated continuously in the duplex tray 108, so that at the end of the 33rd document set circulation there would be 99 copy sheets in the duplex tray 108, i.e., 33 even-side printed 3 sheet buffer sets.

Continuing with this example, during the 34th document set circulation the inverter system would be operated in the same manner as it was during the first circulation. That is, the documents would be fed during the 34th circulation through the duplex inverting path 58. Thus, on the 34th through 66th document set circulations here, only the other (opposite) or odd page sides of the documents would be copied, i.e., pages 5, 3, and 1, in that order, in each circulation, in this example. Note that this second sequence of 32 circulations (35th through 66th) is also all in the simplex mode, i.e., entirely through the simplex path 54. The inverter operation through the duplex path 58 is not repeated again until the 67th document set circulation. Meanwhile during these 34th through 66th document set circulations the 99 copy sheets which were previously stacked in the duplex tray 108 in the preceeding first copying sequence are fed out continuously therefrom to continuously receive their second or odd side images on the blank backsides thereof. Thus, as the end of this second sequence, i.e., by the end of the 66th document set circulation, the duplex tray 108 is again empty, and 33 completed three sheet duplex pre-collated copy sets will be provided in the output path in the proper sequence and page orientation, i.e., exited: 5/blank, $\frac{3}{4}$, $\frac{1}{2}$; 5/blank, $\frac{3}{4}$, $\frac{1}{2}$,; etc., etc., thirty-three times. Thus, after stacking in the output, the copy sets will be properly collated from top-to-bottom in the order $\frac{1}{2}$, $\frac{3}{4}$, 5/blank; $\frac{1}{2}$, $\frac{3}{4}$, 5/blank; etc. These completed sets are delivered to the output only during the second, and subsequent alternate, sequences of document set circulations in this example.

The number of document circulations is, of course, limited by the total number of copy sets to be made, as well as by the number of documents in the document set. This may be accomplished by limiting the number of document circulations in the last 2 sequences. Thus, for example, described above, if, for example, the total number of copy sets selected were 86, the first and second sequences of 33 document set circulations described above would be followed by third and fourth sequences of 33 more document set circulations each, copying the even and odd page sides respectively, to make 33 more completed duplex copy sets or a total of 66 completed copy sets. However, to avoid exceeding the 86 copies which the operator selected here, on the 5th and 6th document set circulation sequences here there would be only 20 more even side copying circulations followed by only 20 more odd side circulations to produce only 20 more copy sets, for a total of 86. This will also empty out the duplex tray 108 at the end of the production of the 86 selected copies. As indicated above, this is a total of only six actuations of the inverter; i.e., only 6 circulations of each document through the inverter path 58, out of a total of 172 document set circulations in this example.

This determination of the number of document set circulations during the last two (equal) sequences is again a simple arithmetical calculation in the controller 100, and may be done in various ways. For example, the controller 100 will contain the number 33 in its memory in this example, which is the quotient of its previous calculation of the number of desired document set circulations to fill the duplex tray 108. That number 33 can be itself then divided into the number of selected copies, here 86, to provide another integral quotient and its remainder. In this case the integral quotient of 33 divided into 86 is two and the remainder is twenty. Thus, the controller 100 with this simple calculation automatically has all of the information needed to control the operation of the document set inverter 40, 60. From this calculation the controller knows here that after only two complete copying sequences, i.e., after only two 33 even side document circulations and two odd side document circulations interposed therebetween) that this integral two quotient is satisfied and that only the remainder of 20 more document sets needs to be provided in the last two sequences, i.e., 20 more even side document circulations and 20 more even odd side document circulations. The controller 100 only needs to actuate the inverting path 58 once between these two final 20 circulation sequences. Of course, the buffer tray 108 is not fully filled by the 60 copy sheets placed therein during the next-to-last sequence of 20 document set circulations.

Note that in the above example the 86 set copy sheet output is delivered from the second and fourth copying circulation sequences of 33 circulations each, and during the 6th (last 20 circulation) sequence. During the first and third 33 circulation sequences and the first 20 circulation sequence (the 5th sequence), there is no output production. Rather the duplex tray 108 is accumulating all of the copies made as multiple buffer sets of simplexed or half completed copies.

Regardless of the number of copies being made, or the number of documents, at the end of the last copying circulation of the duplex document set the documents have been automatically properly re-collated in the document handler tray 22. That is, with this system they are automatically in the proper order to be removed by the operator at the end of copying. An additional non-copying set circulation, or an inverting circulation, is not required to achieve this recollation of the document sheets in the tray 22, since in this system on the last circulation the odd sides are being copied and are being restacked face-up in the tray 22.

If, in the above example, only 30 copy sets were requested by the operator, instead of 86, then it may be seen that the integer quotient of 30 divided by 33 is zero and the remainder is 30. Therefore, the RDH would only circulate the document set 30 times in the first sequence to copy the even page sides and then 30 more times to copy the odd page sides, for 60 total circulations. In other words in this case only the last two copying sequences would be utilized, and the duplex path 58 would only be utilized during the first and 31st circulations. This, of course, is only for this special case where the number of requested copy sets is smaller than the quotient of the number of documents divided into the constant corresponding to the duplex tray capacity. Taking a different example of a 15 sheet duplex document sets with a 50 sheet duplex tray capacity, the integer quotient would only be three, and the above special case condition would only occur where three or less copies were requested. However, in this 15 document sheet and 50 copy sheet tray 108 example, the inverting path 58 would be utilized much more frequently, i.e., during the first and fourth document set circulations, and every third circulation thereafter. The capacity of the duplex tray 108 is preferably (but not necessarily) substantially greater than that of the RDH 20 tray 22 to generally allow higher multiple integer divisions of the document set size into the duplex tray capacity, i.e., longer sequences of non-inverter operation circulations.

The disclosed copier and document handler unit can automatically handle a wide latitude of original document sets with a minimum of operator interaction. In a typical job, the operator need only drop the set of documents to be copied into the open loading tray 22 on top of the RDH 20, program the desired number of copies to be made in the controller 100 switches, indicate if duplex documents rather than simplex have been loaded (by pressing another button on the controller 100), and then initiating the copying run sequence by pressing the conventional "start print" button on the controller. There may, of course, be some adjustment needed for side or rear guides in the tray 22 for different sizes of documents. Except for jam clearance, there would normally be no other operator interaction required with the copier or document handler to provide pre-collated output sets.

It will be appreciated than an additional button on the controller 100 may be provided for the operator to indicate that the last page of the duplex document set is blank, so that its copying can be automatically inhibited, and the feeding of a copy sheet thereof into the duplex tray 108 avoided. The last copy sheet will be generated from the copying of the next-to-last (N minus 1) document page automatically onto a clean copy sheet fed from tray 106 or 107, rather than 108. Since this will be a sheet with the odd page side printed last, and the other (even) side blank, it will have proper output collation without the inverter 116.

While the duplex document pre-collation copying system disclosed herein is preferred, it will be appreciated that various alternatives, modifications, variations or improvements thereon may be made by those skilled in the art, and the following claims are intended to encompass all of those falling within the true spirit and scope of the invention.

What is claimed is:

1. In the method of pre-collation copying of both sides of a set of duplex document sheets by plurally recirculating and inverting said documents and serially copying said documents during said plural circulations, wherein the number of said plural circulations is determined by the number of pre-collated copy sets being made from said document set, the improvement comprising:

copying only one side of said documents in a first succession of contiguous plural documents circulations, and then copying only the other side of said documents in a second succession of contiguous plural document circulations, and alternating repeating said first and second successions of document circulations, wherein the number of said document set circulations in said first and second successions of document circulations are substantially equal to one another but vary in number depending upon the number of documents in said document set, wherein said documents in both said first and second successions of plural document circulations are circulated in a continuous loop with a constant and even total number of document sheet inversions so that the same sides of said documents are copied in each said document set circulation within each said succession, and wherein there is provided a single document set inversion circulation between each of said first and second successions so that the sides of the documents copied in said second successions are opposite from the sides copied in said first successions.

2. The method of claim 1, wherein the number of said document set circulations in each of said first and second successions is determined by counting the number of document sheets in the document set as it is circulated and dividing that document sheet set count into a constant number to obtain an integral number quotient.

3. The method of claim 1, wherein the copies made in each said first succession of document circulations are temporarily stored in a buffer set of a predetermined maximum effective copy sheet capacity, and wherein the number of said document circulations in each of said first and second successions is a number corresponding to the number of document sheets in said document set divided into said maximum effective sheet capacity of said buffer set.

4. The method of claim 1, wherein said first and second successions are repeated to produce a selected total number of copies, but wherein the number of document set circulations on the last of said first and second successions is limited to the number needed to complete said selected total number of copy sets.

5. In the method of pre-collation copying of both sides of a set of duplex document sheets, by plurally circulating and serially copying said documents during said plural circulations, and by inverting said documents an odd number of total times during a circulation utilizing inverter means to copy opposite sides of the document, controlled by a control means, the improvement comprising:

inhibiting the operation of said inverter means with said control means during a first succession of contiguous plural document circulations to copy only one side of said documents, actuating said inverter means with said control means to invert the document set during a document circulation after the document set has been circulated a number of times substantially equal to the quotient of a constant number divided by the number of document sheets in said document set, inhibiting the operation of said inverter means again to copy only the other side of said documents in a second succession of contiguous plural document circulations substantially equal to the number of documents set circulations in said first succession, and repeating said actuations and inhibitions of said inverter means and said first and second successions by a number of times determined by said control means.

6. The method of claim 5, wherein the number of document set circulations on the last of said first and second successions is limited to the number needed to complete a total number of copy sets selected in said control means.

7. The method of claim 5, wherein said copies of one side made in each of said first successions of document circulations are temporarily stored in a buffer set of a pre-determined maximum effective copy sheet capacity, and wherein the number of said document circulations in each of said first and second successions is a number corresponding to the quotient of the number of document sheets in said document set divided into said maximum effective sheet capacity of said buffer set rounded off to the nearest lower integer, and wherein the number of document set circulations on the last of said first and second successions is limited to the number needed to complete a requested total number of copy sets obtained from the remainder of said nearest lower integer divided into the requested total number of copy sets.

8. The method of claims 5, 6 or 7, comprising the additional step of operating said inverter means during the first circulation of said duplex document set.

9. In a method of pre-collation copying a set of a known number of duplex document sheets, wherein the documents can be inverted an odd total number of times during a circulation with inverter means, to copy opposite sides of the document in a subsequent circulation, controlled by a control means; the improvement comprising:

actuating said inverter means with said control means to invert the document set during the first document set copying circulation;

inhibiting the operation of said inverter means with said control means during successions of subsequent contiguous plural document copying circulations to copy only one side of said documents;

actuating said inverter means again during only single document circulations at the end of each of said successions, which occurs each time after the document set has been circulated a number of times in succession equal to the quotient of a constant number divided by the number of document sheets in said document set, to copy opposite sides of said documents in alternate successions of equal numbers of plural document set circulations;

said inverter means being so operated by a number of times determined by said control means from the total number of copies to be made; and wherein the copies made in alternate said successions of document circulations are temporarily stored in a buffer set of a pre-determined maximum copy sheet capacity, and wherein said constant number corresponds to said copy sheet capacity.

10. In a recirculating document feeding apparatus for a copier with control means with which a set of duplex document sheets may be multiply serially recirculated and inverted and copied for pre-collation copying of both sides of said documents, wherein said duplex document sheets are inverted by selectively operable inverting means in the recirculation path of said documents, and wherein means are provided for counting the number of document sheets in said document set, the improvement wherein:

said inverting means is actuated in response to the number of documents counted in said document set, said inverting means being actuated only during a limited number of said document set circulations between successions of contiguous plural document set circulations, during which successions the inverting means is inhibited.

11. The apparatus of claim 10, wherein said control means controls said document feeding apparatus and said inverting means in response to dividing the number of document sheets counted in the document set into a constant number to determine the number of document set circulations in said successions of document circulations between the actuation of said inverting means.

12. The apparatus of claim 11, wherein said constant number is the pre-determined maximum effective copy sheet capacity of a duplex copy sheet buffer set intermediate storage means in said copier.

* * * * *